United States Patent
Redman et al.

(10) Patent No.: US 7,823,948 B2
(45) Date of Patent: Nov. 2, 2010

(54) SYSTEM FOR SHELF MOUNTING IN MOBILE TRUCK BODY

(75) Inventors: Randal Redman, Britt, IA (US); Karl J. Bauer, Garner, IA (US)

(73) Assignee: Iowa Mold Tooling Co., Inc., Garner, IA (US)

( * ) Notice: Subject to any disclaimer, the term of this patent is extended or adjusted under 35 U.S.C. 154(b) by 0 days.

(21) Appl. No.: 12/094,967

(22) PCT Filed: Nov. 22, 2006

(86) PCT No.: PCT/US2006/045161

§ 371 (c)(1),
(2), (4) Date: May 23, 2008

(87) PCT Pub. No.: WO2007/064544

PCT Pub. Date: Jun. 7, 2007

(65) Prior Publication Data

US 2008/0284188 A1   Nov. 20, 2008

Related U.S. Application Data

(60) Provisional application No. 60/740,110, filed on Nov. 28, 2005.

(51) Int. Cl.
*B60R 9/02* (2006.01)
(52) U.S. Cl. ...................... 296/37.6; 224/404
(58) Field of Classification Search ............... 296/37.6, 296/24.3, 24.4, 24.44, 24.45; 211/187, 90.02; 312/348.3; 224/402–404
See application file for complete search history.

(56) References Cited

U.S. PATENT DOCUMENTS

| | | | | | |
|---|---|---|---|---|---|
| 3,326,595 | A | * | 6/1967 | Ogilvie | 296/37.6 |
| 3,556,306 | A | * | 1/1971 | Shell | 211/90.02 |
| 3,929,371 | A | * | 12/1975 | Gibson | 296/24.44 |
| 5,421,645 | A | * | 6/1995 | Young | 312/108 |
| 6,030,018 | A | * | 2/2000 | Clare et al. | 296/37.6 |

(Continued)

FOREIGN PATENT DOCUMENTS

GB    333004    3/1930

OTHER PUBLICATIONS

International Search Report and Written Opinion for International Application No. PCT/US2006/045161; mailed Mar. 26, 2007; 12 pages.

(Continued)

*Primary Examiner*—Glenn Dayoan
*Assistant Examiner*—Gregory Blankenship
(74) *Attorney, Agent, or Firm*—Foley & Lardner LLP

(57) ABSTRACT

A system for mounting adjustable shelves (206) in mobile truck body-applications. The system includes integrated attachment means adapted to receive a cross-member (202) for affixing thereto. The integrated attachment means are integrated into the panels forming the compartments (102, 112,114,116) of the body side pack. The system further includes one or more shelves (206), which include at least two slots, disposed along the periphery surface of the shelf (206) so as to receive a corresponding fastener (208). The cross-member (202) includes at least two slots, corresponding to the slots in the shelf (206), such that a fastener (208) extends through the slots to secure the shelf to the panel of the compartment.

20 Claims, 3 Drawing Sheets

U.S. PATENT DOCUMENTS

| | | | | |
|---|---|---|---|---|
| 6,131,981 A | * | 10/2000 | Finley | 296/37.6 |
| 6,139,081 A | * | 10/2000 | Lemieux | 296/37.7 |
| 6,142,549 A | * | 11/2000 | Clare et al. | 296/37.6 |
| 6,237,211 B1 | * | 5/2001 | Clare et al. | 29/434 |
| 6,499,795 B2 | * | 12/2002 | Clare | 296/183.1 |
| 6,941,654 B1 | * | 9/2005 | Sears | 29/897.2 |
| 7,104,583 B2 | * | 9/2006 | Clare | 296/37.6 |
| 2005/0225108 A1 | | 10/2005 | Panasewicz et al. | |

OTHER PUBLICATIONS

European Patent Office Communication pursuant to Article 94(3) EPC for Application No. 06 838 245.6-2423, dated Nov. 4, 2009, 5 pages.

European Patent Office Summons to attend oral proceedings pursuant to Rule 115(1) EPC for Application No. 06838245.6-2423 / 1959791, dated Mar. 22, 2010, 4 pages.

* cited by examiner

SYSTEM FOR SHELF MOUNTING IN MOBILE TRUCK BODY

CROSS-REFERENCE TO RELATED PATENT APPLICATIONS

This application claims priority from Provisional Application U.S. Application 60/740,110, filed Nov. 28, 2005, incorporated herein by reference in its entirety.

BACKGROUND OF THE INVENTION

This invention is directed to a system for shelf mounting, more particularly, to a system and method for mounting shelves on integrated hangers in a mobile truck body.

Mobile truck bodies are typically modular in design and include at least two side packs. These side packs each include one or more storage compartments, suitably configured to enclose tools, equipment, and the like. The most common side packs are pre-configured with installed-shelving, which is not adjustable by the end user. When adjustable shelving is offered to the end user, the adjustable shelves require substantial effort to raise, lower, or remove the shelves. Hence, shelf hangers typically require independent installation onto the walls of the compartments in the body side packs.

Thus, there is a need for a system and method for mounting adjustable shelves in mobile truck body applications that would be more convenient for the end user, require less effort for installation, and be suited for commercial use.

SUMMARY OF THE INVENTION

There is provided a system and method for mounting adjustable shelves.

Further, there is provided a system and method for mounting adjustable shelves onto the walls of compartments in a mobile truck body using integrated hangers.

Still further, there is provided a system and method for integrating attachment means into the walls of compartments in a body side pack so as to provide predetermined positions for shelving to a user.

There is provided a system for mounting adjustable shelves in mobile truck body applications. The mobile truck body comprises at least one storage compartment that includes a first interior space and at least one first upstanding panel that at least partially defines the first interior face. The system comprises a first attachment means including at least two first hanger components. The first attachment means is adapted to be integrated into the at least one first upstanding panel such that the at least two first hanger components are disposed transversely at a predetermined distance from each other. The at least two first hanger components extend into the first interior space. The system also comprises at least one first cross-member including at least two slots therethrough disposed correspondingly to the at least two first hanger components. The system further comprises at least one shelf member having at first and a second opposed periphery surface. The at least one shelf member includes at least two slots therethrough disposed along the first periphery surface correspondingly to the at least two first hanger components. The first attachment means is adapted to receive and engage the at least one first cross-member, which is adapted to receive the at least one shelf member. The respective slots included in the at least one shelf member and in the at least one first cross-member are adapted to receive a corresponding fastener, which extends therethrough and is adapted to secure the at least one shelf member to the at least one first cross-member.

There is also provided a vehicle comprising a support platform. A support member coupled to the support platform and configured to engage a surface. A storage compartment coupled to the support platform, the storage compartment including a first interior space and at least one first upstanding panel at least partially defining the first interior space. The storage compartment including at least two first hanger components configured to be integrated into the one first upstanding panel and disposed transversely at a predetermined distance from each other and extending into the first interior space. A first cross-member defining at least two slots therethrough disposed correspondingly to the two first hanger components. A shelf member having a first and a second opposed periphery surface, the shelf member comprising at least two slots therethrough disposed along the first periphery surface correspondingly to the two first hanger components. Wherein the two first hanger components are configured to receive and engage the cross-member. Wherein the cross-member is adapted to receive the shelf member. Wherein the respective slots included in the shelf member and in the cross-member are configured to receive a corresponding fastener, which extends therethrough and is configured to secure the shelf member to the cross-member.

At least one storage compartment further comprises at least one second upstanding panel opposed to the at least one first upstanding panel to form the first interior space. The system for shelf mounting further comprises a second attachment means including at least two second hanger components. The second attachment means is adapted to be integrated into the at least one second upstanding panel such, that the at least two second hanger components are disposed transversely correspondingly to the at least two first hanger components extending thereby, into the first interior space. The system also comprises at least one second cross-member including at least two slots therethrough disposed correspondingly to the at least two second hanger components. The at least one shelf member further includes at least two slots therethrough disposed along the second periphery surface correspondingly to the at least two second hanger components. The second attachment means is adapted to receive and engage the at least one second cross-member, which is adapted to receive the at least one shelf member. The respective slots included along the second periphery surface in the at least one shelf member and in the at least one second cross-member are adapted to receive a corresponding fastener, which extends therethrough and is adapted to secure the at least one shelf member to the at least one second cross-member.

Still further, the first hanger components and the second hanger components, preferably, have a substantially L shaped cross-section. The hanger components are integrated into respective upstanding panels such that a portion of each hanger component extends substantially orthogonally from the respective upstanding panel into the first interior space, wherein another portion of each hanger component is substantially parallel to a surface of the respective upstanding panel. The integral extending portions of the first and second hanger components that extend substantially orthogonally from the respective upstanding panels form a weather stripping. It will be appreciated by a skilled artisan that the at least one storage compartment, preferably, includes at least one door upstanding panel.

The at least one second upstanding panel serves as a divider panel to form at least one storage compartment. In this embodiment the system further comprises a third attachment means including multiple hanger components. The third attachment means is adapted to be integrated into the at least one second upstanding panel such as to extend into the second interior space. As it will be appreciated by those skilled in the art, at least one dimension the first interior space and at least one dimension the second interior space corresponds to at least one dimension of the at least one shelf member.

As will be understood by those skilled in the art, the at least one storage compartment is, preferably, a side pack storage compartment of the mobile truck body.

Still other aspects of the system for shelf mounting will become readily apparent to those skilled in this art from the following description, simply by way of illustration of one of the best modes suited for to carry out the invention. As it will be realized by those skilled in the art, the system is capable of other different embodiments and its several details are capable of modifications in various obvious aspects. Accordingly, the drawing and descriptions will be regarded as illustrative in nature and not as restrictive.

BRIEF DESCRIPTION OF THE DRAWINGS

The accompanying drawings incorporated in and forming a part of the specification, illustrate several aspects of the system for shelf mounting. In the drawings.

DETAILED DESCRIPTION OF THE PREFERRED EMBODIMENTS

This invention is directed to a system for shelf mounting in a mobile truck body. In particular, to a system for mounting shelves on integrated hangers in mobile truck body applications. The mounting system and method includes hanger components, which are integrated into panels that make up the compartments of a side pack of a truck body. The system and method also include a drop-in mounting bar and shelf, which enable quick and easy installation of the shelves at predetermined positions by the user. The system and method eliminate the need for shelf hangers to be independently installed onto the walls of the compartments in a body side pack.

Figure 1:
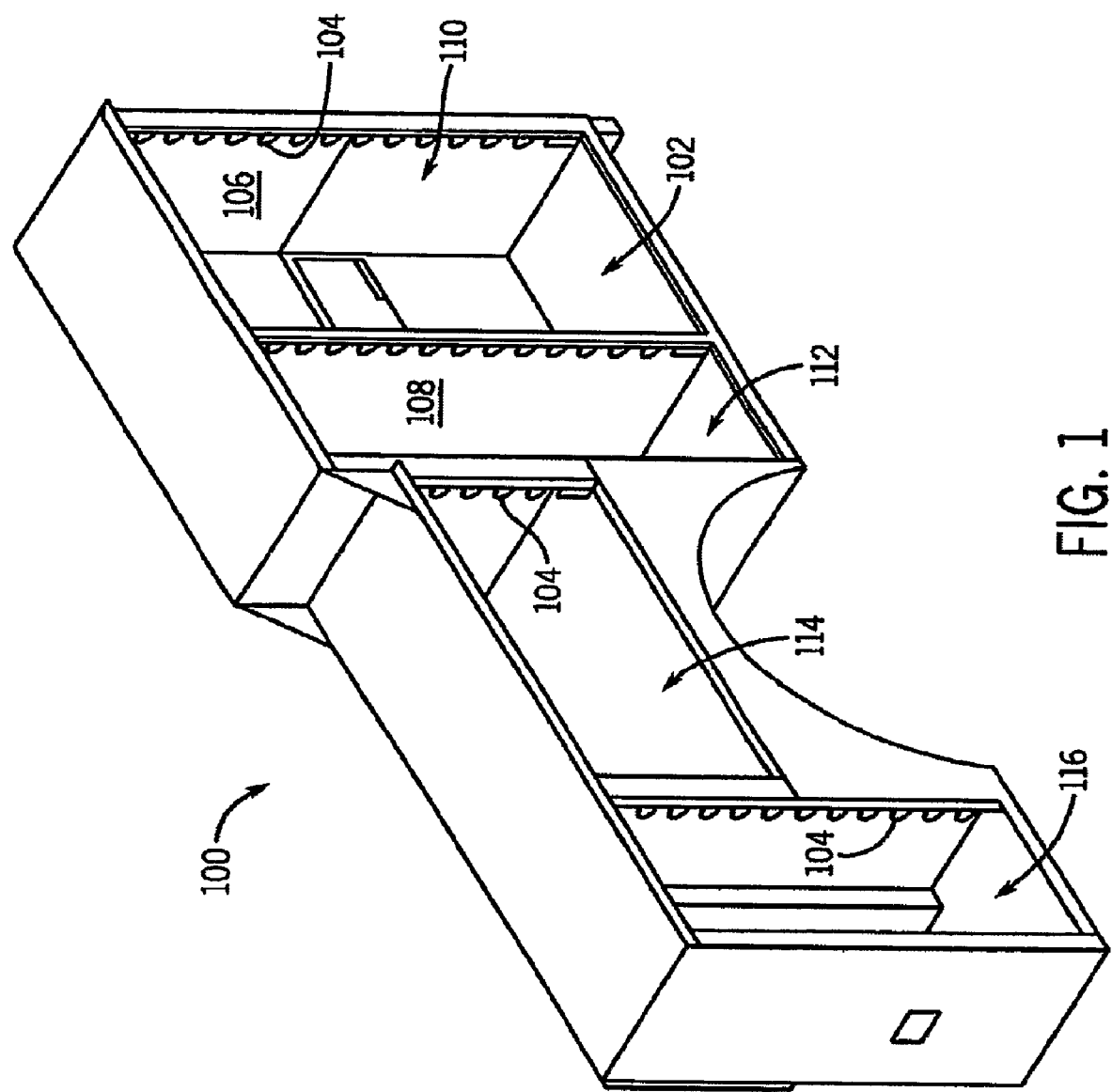
FIG. 1 is an isometric view of a side pack for a mobile truck body including an exemplary embodiment of a system for shelf mounting.

Referring to FIG. 1, there is shown an isometric view of a side pack 100 for a mobile truck body. The side pack 100 includes a plurality of storage compartments, with storage compartment 102 being used herein for illustrating and example purposes. It should be understood that each or any of the storage compartment 102 may include a door. The storage compartment 102 is advantageously formed from a plurality of upstanding panels 106. The side pack 100 also includes hanger components 104, which are integrated into the upstanding panels 106.

As shown in FIG. 1, the hanger components 104 are disposed along the vertical door jams and proximate the back corners of the storage compartment 102. The storage compartment 102 advantageously includes a door panel (not shown in the drawing). It will be appreciated by those skilled in the art that the hanger components 104 situated adjacent to the door jams are part of, and integrally formed into the upstanding panels 106 which form the vertical panel components of the storage compartment 102. In accordance with one embodiment an upstanding panel 108 serves as a divider panel to divide the storage compartment 102 into a first and second adjacent vertical storage compartments having a first and second adjacent interior space 110, 112, respectively.

The hanger components 104, preferably, have a substantially L shaped cross-section and are integrated into the respective upstanding panels 106, 108 such that a portion of each hanger component 104 extends substantially orthogonally from the respective upstanding panel 106, 108 into the respective interior space 110, 112. Another portion of each hanger component 104 is substantially parallel to the surface of the respective upstanding panel 106, 108. It will be appreciated by those skilled in the art that the hanger components 104 are advantageously formed into the respective upstanding panel 106, 108 in one embodiment the hanger components 104 are welded to the divider panel 108. In another embodiment the hanger component 104 is formed during the manufacture of the upstanding panel 108, for example by a purchased brake process. The integral portions of respective hanger portions of respective hanger components 104 that extend substantially orthogonally from the respective upstanding panels 106, 108, advantageously form a weather stripping. The side pack 100 for a mobile truck body is not limited to a particular number and/or orientation of storage compartments. Thus, the embodiment illustrated in FIG. 1 also includes storage compartments 114, 116 with hanger components 104 integrated into respective upstanding panels 118, 120, which define the storage compartments 114, 116.

Figure 2:
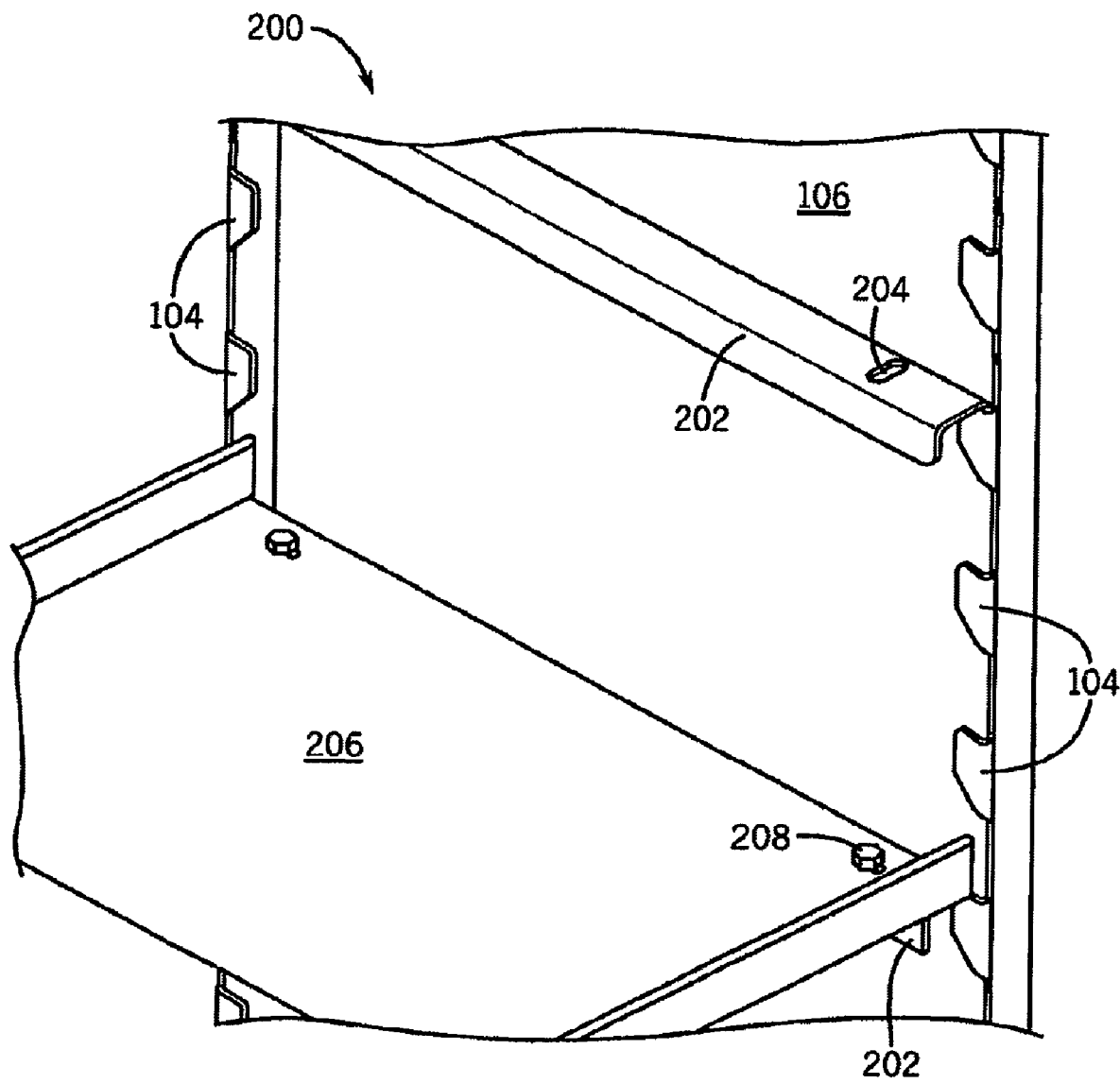
FIG. 2 is a isometric view of integrated hanging components of the system for shelf mounting in the mobile truck body illustrated in FIG. 1.

Referring to FIG. 2, there is shown a detailed isometric view of an exemplary embodiment of a hanger component mounting system. The detailed view of FIG. 2 shows a compartment 200 formed in a side pack 100. The system uses a cross-member 202, also referred to as a drop-in-mounting bar, which is received by respective hanger components 104. The cross-member 202 advantageously engages the hanger components 104 running along the upstanding panel 106. Once the cross-member 202 is suitably engaged with the hanger components 104, a shelf member 206 is placed on top of the cross-member 202. It will be appreciated by those skilled in the art that both sides of the compartment 102 include hanger components 104 upon which a corresponding cross-member 202 is actively engaged.

The shelf 206 is secured to the cross-member 202 via fasteners 208 extending through slots 204. The skilled artisan will appreciate that the slots 204 advantageously align with slots located in the shelf member 206. the fasteners 208 are then secured via any means known in the art such that the shelf 206 is securely attached to the side body pack 100. Suitable fasteners 208 include, for example and without limitation, nuts, bolts, screws, and the like. The skilled artisan will appreciate, that the side body pack 100 is advantageously constructed from any suitable material known in the art, including, for example and without limitation, aluminum, steel, high-density plastic, or the like. Preferably, the hanger components 104 are constructed so as to support weights in excess of 250 pounds distributed on the shelf FIG. 206.

Figure 3:
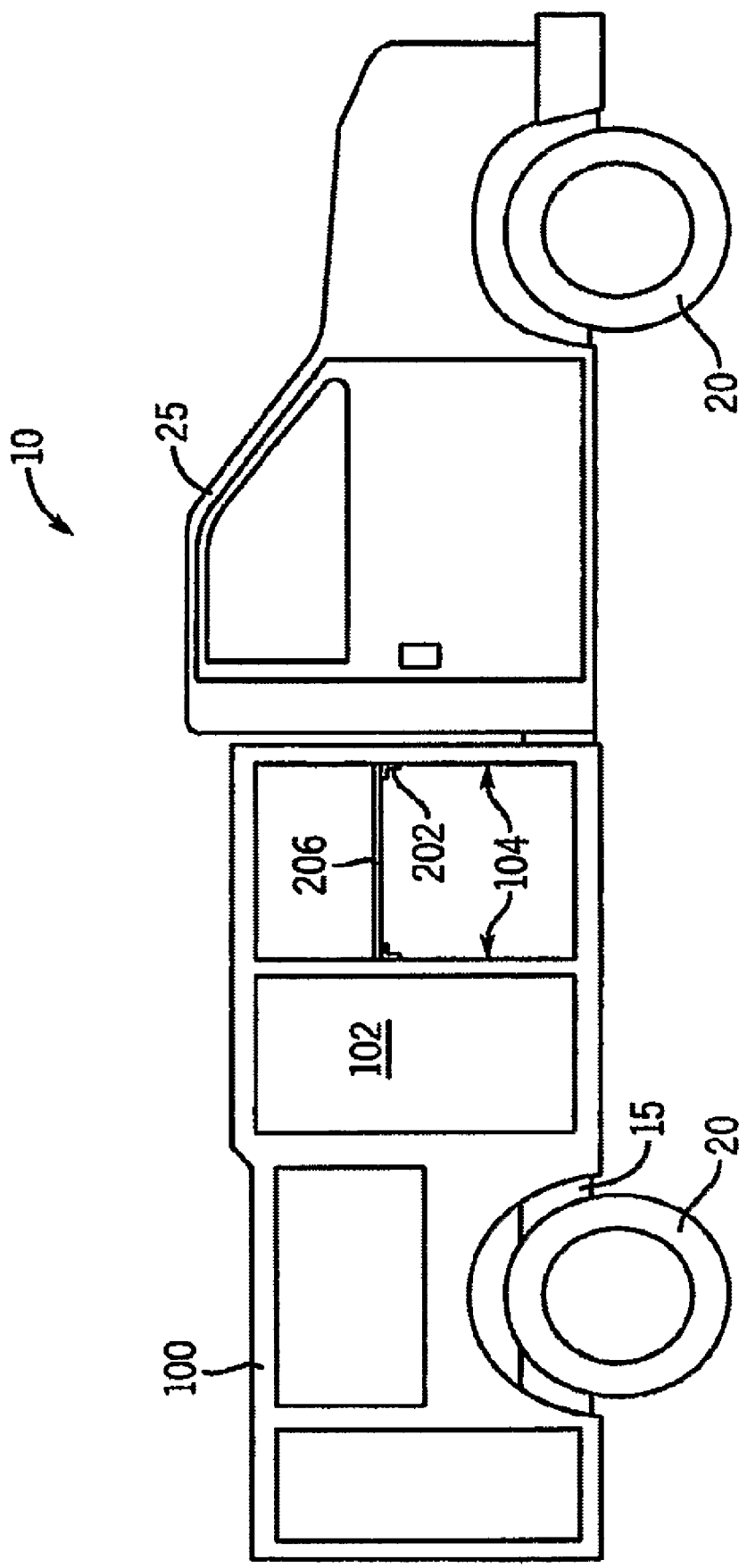
FIG. 3 is a schematic view of a vehicle with a side pack including a system for shelf mounting according to an exemplary embodiment.

Referring to FIG. 3, a vehicle 10 is shown according to an exemplary embodiment. Vehicle 10 is a truck that includes a side pack 100, a support structure 15 (e.g., frame, bed, platform, chassis, etc.), one or more support members 20, and a cab 25. According to various exemplary embodiments, support members 20 may be wheels, tracks, or any other members that are in communication with both the ground and the support structure 15. Support structure 15 provides a structure to which side pack 100 and cab 25 are coupled. Cab 25 provides a compartment for one or more occupants where one of the occupants is a driver. Side pack 100 includes a plurality of storage compartments 102. Hanger components 104 are provided on walls of storage compartments 102 to support cross-members or mounting bars 202. Shelves 206 are coupled to mounting bars 202. While vehicle 10 is shown as a truck with a single rear axle, it should be understood that vehicle 10 may have more than one rear axle. According to other exemplary embodiments, vehicle 10 may not be self-propelled and may be a platform, trailer or other structure that is towed or otherwise propelled by a truck.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitable entitled.

What is claimed is:

1. A system for shelf mounting in a mobile truck body, the mobile truck body including a side pack including a storage compartment, the storage compartment including a first interior space and at least one first upstanding panel at least partially defining the first interior space, comprising:
   at least two first hanger components integrated into the one first upstanding panel and disposed transversely at a predetermined distance from each other and extending into the first interior space, wherein the first hanger components are integrated into the first upstanding panel such that a portion of each first hanger component extends substantially orthogonally from the first upstanding panel into the first interior space and another portion of each first hanger component extends substantially parallel to a surface of the first upstanding panel, and further wherein the portion of the first hanger components that extend substantially orthogonally from the one first upstanding panel form a weather stripping;
   a first cross-member defining at least two slots therethrough; and
   a shelf member having a first and a second opposed periphery surface, the shelf member comprising at least two slots therethrough disposed along the first periphery surface;
   wherein the two first hanger components are configured to receive and engage the first cross-member;
   wherein the first cross-member is adapted to receive the shelf member; and
   wherein the respective slots included in the shelf member and in the first cross-member are configured to receive a corresponding fastener, which extends therethrough and is configured to secure the shelf member to the first cross-member.

2. The system for shelf mounting of claim 1 wherein the storage compartment further comprises a second upstanding panel opposed to the first upstanding panel to form the first interior space, the system for shelf mounting further comprising:
   two second hanger components integrated into the one second upstanding panel and disposed transversely correspondingly to the two first hanger components extending thereby into the first interior space; and
   a second cross-member defining at least two slots therethrough;
   wherein the shelf member further includes two additional slots therethrough disposed along the second periphery surface in the shelf member correspondingly to the two second hanger components;
   wherein the two second hanger components are configured to receive and engage the second cross-member;
   wherein the second cross-member is configured to receive the shelf member; and
   wherein the respective slots included along the second periphery surface in the shelf member and in the second cross-member are configured to receive a corresponding fastener, which extends therethrough and is configured to secure the shelf member to the second cross-member.

3. The system for shelf mounting of claim 1, including:
   at least two additional first hanger components;
   wherein the two additional first hanger components are integrated into the one first upstanding panel such that the first hanger components and two additional first hanger components are disposed longitudinally at predetermined corresponding distances from each other along respective first and second substantially vertical sides of the one first upstanding panel extending thereby, into the first interior space.

4. The system for shelf mounting of claim 2 including:
   at least two additional second hanger components;
   wherein the two additional second hanger components are integrated into the one second upstanding panel such that the second hanger components and two additional second hanger components are disposed longitudinally correspondingly to the first hanger components along respective first and second substantially vertical sides of the second upstanding panel extending thereby, into the first interior space.

5. The system for shelf mounting of claim 2 wherein the width of the shelf member is substantially the same as the width of the first interior space.

6. The system for shelf mounting of claim 1 wherein the first hanger components have a substantially L shape.

7. The system for shelf mounting of claim 2 wherein the second hanger components have a substantially L shape and are integrated into the one second upstanding panel such that a portion of each second hanger component extends substantially orthogonally from the second upstanding panel into the first interior space, another portion of each second hanger component being substantially parallel to the surface of the second upstanding panel.

8. The system for shelf mounting of claim 7 wherein the integral portions of the second hanger components that extend substantially orthogonally from the one second upstanding panel form a second weather stripping.

9. The system for shelf mounting of claim 2 wherein the at least one second upstanding panel serves as a divider panel to form at least another storage compartment with a second interior space adjacent to the at least one storage compartment.

10. The system for shelf mounting of claim 9 further comprising multiple hanger components configured to be integrated into the at least one second upstanding panel such as to extend into the second interior space.

11. A vehicle comprising:
a support platform;
a support member coupled to the support platform and configured to engage a surface;
a side pack comprising a storage compartment coupled to the support platform, the storage compartment comprising;
a first interior space and at least one first upstanding panel at least partially defining the first interior space;
at least two first hanger components integrated into the one first upstanding panel and disposed transversely at a predetermined distance from each other and extending into the first interior space, wherein the first hanger components are integrated into the first upstanding panel such that a portion of each first hanger component extends substantially orthogonally from the first upstanding panel into the first interior space and another portion of each first hanger component extends substantially parallel to a surface of the first upstanding panel, and further wherein the portion of the first hanger components that extend substantially orthogonally from the one first upstanding panel form a weather stripping;
a first cross-member defining at least two slots therethrough; and
a shelf member having a first and a second opposed periphery surface, the shelf member comprising at least two slots therethrough disposed along the first periphery surface correspondingly to the two first hanger components;
wherein the two first hanger components are configured to receive and engage the first cross-member;
wherein the first cross-member is adapted to receive the shelf member; and
wherein the respective slots included in the shelf member and in the first cross-member are configured to receive a corresponding fastener, which extends therethrough and is configured to secure the shelf member to the first cross-member.

12. The vehicle of claim 11 wherein the storage compartment further comprises a second upstanding panel opposed to the first upstanding panel to form the first interior space, the storage compartment further comprising:
two second hanger components integrated into the one second upstanding panel and disposed transversely correspondingly to the two first hanger components extending thereby into the first interior space; and
a second cross-member defining at least two slots therethrough;
wherein the shelf member further includes two additional slots therethrough disposed along the second periphery surface in the shelf member correspondingly to the two second hanger components;

wherein the two second hanger components are configured to receive and engage the second cross-member;
wherein the second cross-member is configured to receive the shelf member; and
wherein the respective slots included along the second periphery surface in the shelf member and in the second cross-member are configured to receive a corresponding fastener, which extends therethrough and is configured to secure the shelf member to the second cross-member.

13. The vehicle of claim 11, including:
at least two additional first hanger components;
wherein the two additional first hanger components are integrated into the one first upstanding panel such that the first hanger components and two additional first hanger components are disposed longitudinally at predetermined corresponding distances from each other along respective first and second substantially vertical sides of the one first upstanding panel extending thereby, into the first interior space.

14. The vehicle of claim 12 including:
at least two additional second hanger components;
wherein the two additional second hanger components are integrated into the one second upstanding panel such that the second hanger components and two additional second hanger components are disposed longitudinally correspondingly to the first hanger components along respective first and second substantially vertical sides of the second upstanding panel extending thereby, into the first interior space.

15. The vehicle of claim 12 wherein the width of the shelf member is substantially the same as the width of the first interior space.

16. The vehicle of claim 13 wherein the first hanger components have a substantially L shape.

17. The vehicle of claim 12 wherein the second hanger components have a substantially L shape and are integrated into the one second upstanding panel such that a portion of each second hanger component extends substantially orthogonally from the second upstanding panel into the first interior space, another portion of each second hanger component being substantially parallel to the surface of the second upstanding panel.

18. The vehicle of claim 17 wherein the integral portions of the second hanger components that extend substantially orthogonally from the one second upstanding panel form a second weather stripping.

19. The vehicle of claim 12 wherein the at least one second upstanding panel serves as a divider panel to form at least another storage compartment with a second interior space adjacent to the at least one storage compartment.

20. The vehicle of claim 19 further comprising multiple hanger components integrated into the at least one second upstanding panel such as to extend into the second interior space.

* * * * *